(12) United States Patent
Maireanu et al.

(10) Patent No.: US 7,977,911 B2
(45) Date of Patent: Jul. 12, 2011

(54) POWER SUPPLY TOPOLOGY

(75) Inventors: Stefan Maireanu, Sunnyvale, CA (US); Alex Hartular, San Jose, CA (US); Chun Lu, San Jose, CA (US); Jianping Xu, Chengdu (CN); Xinhe Su, Chengdu (CN); Xiaodong Wang, Chengdu (CN)

(73) Assignee: O2 Micro, Inc., Santa Clara, CA (US)

( * ) Notice: Subject to any disclaimer, the term of this patent is extended or adjusted under 35 U.S.C. 154(b) by 923 days.

(21) Appl. No.: 11/906,251

(22) Filed: Oct. 1, 2007

(65) Prior Publication Data
US 2008/0191557 A1 Aug. 14, 2008

Related U.S. Application Data

(60) Provisional application No. 60/900,436, filed on Feb. 8, 2007.

(51) Int. Cl.
*H02J 7/00* (2006.01)
(52) U.S. Cl. ............... 320/103; 320/128; 307/66
(58) Field of Classification Search ............ 320/103, 320/128
See application file for complete search history.

(56) References Cited

U.S. PATENT DOCUMENTS

| | | | | |
|---|---|---|---|---|
| 4,883,724 | A | * | 11/1989 | Yamamoto ............ 429/431 |
| 5,212,431 | A | | 5/1993 | Origuchi |
| 5,389,825 | A | | 2/1995 | Ishikawa |
| 5,686,766 | A | | 11/1997 | Tamechika |
| 6,215,272 | B1 | * | 4/2001 | Ohara et al. ............ 320/104 |
| 6,888,339 | B1 | | 5/2005 | Travaglini et al. |

* cited by examiner

*Primary Examiner* — Edward Tso
*Assistant Examiner* — Samuel Berhanu

(57) ABSTRACT

A power supply system can include a primary power supply coupled to an output, and a secondary power supply coupled to the output. The primary power supply provides power to the output when a voltage level of the secondary power supply is less than a first predetermined level. The secondary power supply provides power to the output when the voltage level of the secondary power supply is greater than the first predetermined level. The secondary power supply not only provides power to the output, but also charges the primary power supply when the voltage level of the secondary power supply is greater than a second predetermined level that is greater than the first predetermined level.

7 Claims, 4 Drawing Sheets

| SWITCH | 112 | 118 | 114 | 112 | 118 | 114 | 112 | 118 | 114 |
|---|---|---|---|---|---|---|---|---|---|
| STATUS | OFF | ON | ON | ON | OFF | OFF | ON | ON | OFF |
| | $V_{102} < REF\_D$ | | | $REF\_D < V_{102} < REF\_C$ | | | $V_{102} > REF\_C$ | | |

POWER SUPPLY TOPOLOGY

RELATED APPLICATION

This application claims priority to U.S. Provisional Application No. 60/900,436, filed on Feb. 8, 2007, which is hereby incorporated by reference in its entirety.

TECHNICAL FIELD

The present invention relates to a power supply topology and in particular to a multiple power supply topology.

BACKGROUND ART

Most portable electronic devices have a dual power supply. Such a dual power supply generally includes a battery pack and an AC adapter. The battery pack is typically embedded inside the electronic device or attached outside the electronic device via a connector.

However, the electronic device is only powered by the battery pack when the AC adapter is not available. As such, if the battery pack is unplugged in order to replace it with another one when the device is in operation, the device will be forced to shut down and any ongoing process will be lost.

SUMMARY OF THE INVENTION

In accordance with one embodiment of the present invention, a power supply system comprises a primary power supply coupled to an output, and a secondary power supply coupled to the output. Advantageously, the primary power supply provides power to the output when a voltage level of the secondary power supply is less than a first predetermined level. The secondary power supply provides power to the output when the voltage level of the secondary power supply is greater than the first predetermined level. The secondary power supply not only provides power to the output, but also charges the primary power supply when the voltage level of the secondary power supply is greater than a second predetermined level that is greater than the first predetermined level.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 3 shows a table illustrating the status of different switches of a dual power supply when the system load is in operation, in accordance with one embodiment of the present invention.

DESCRIPTION OF EMBODIMENTS

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a power supply system which allows a user to replace/remove a secondary power supply while the system is ON and powered by a primary power supply. In one such embodiment, the power supply system also allows the user to replace/remove the primary power supply while the system is ON and powered by the secondary power supply.

Figure 1:
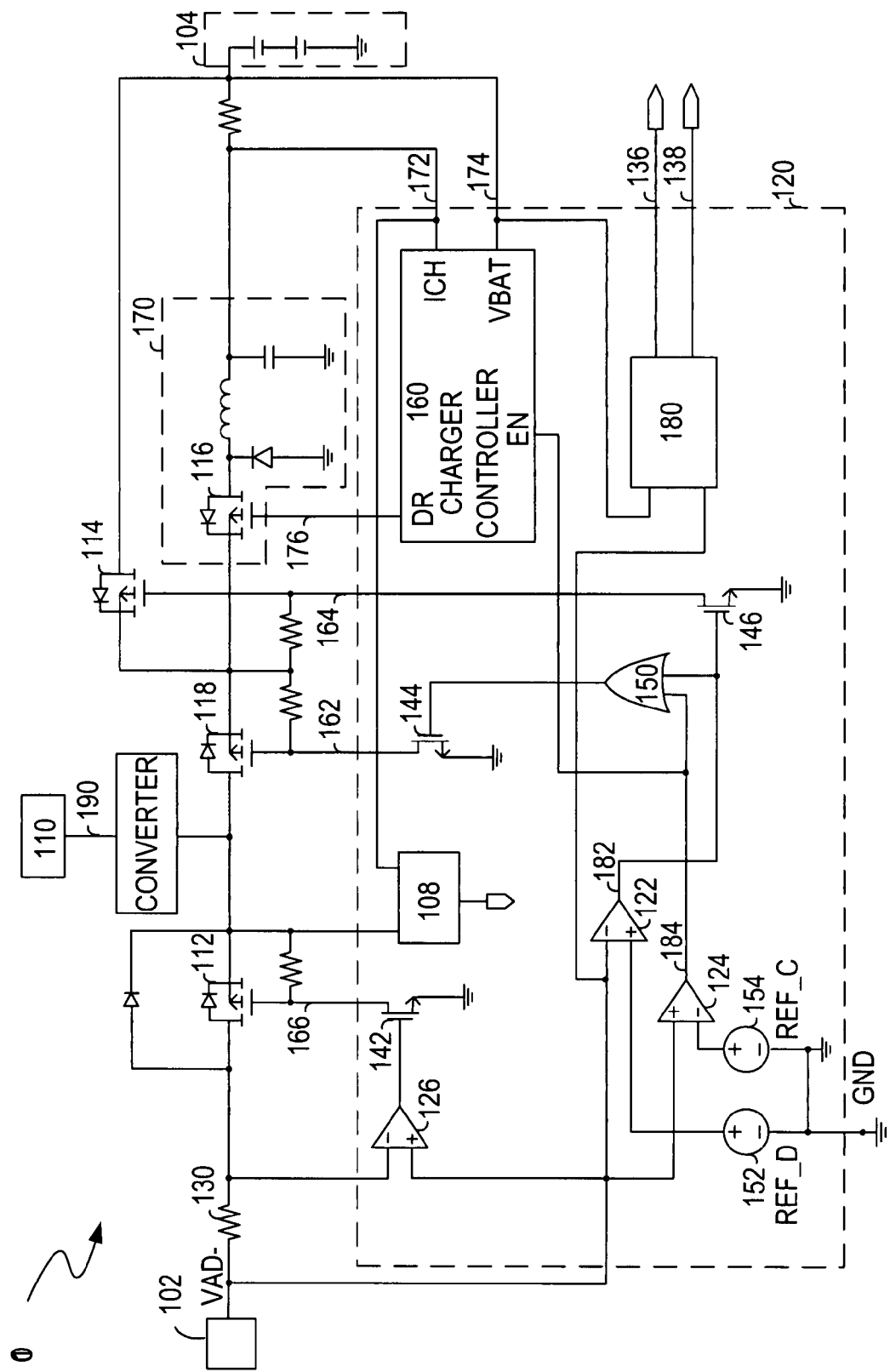
FIG. 1 shows a block diagram of a dual power supply topology, in accordance with one embodiment of the present invention.

FIG. 1 shows a block diagram of a dual power supply system 100, in accordance with one embodiment of the present invention. The dual power supply system 100 includes a primary power supply 104 coupled to an output 190 and a secondary power supply 102 coupled to the output 190. In one embodiment, the primary power supply 104 can be an internal power supply and the secondary power supply 102 can be an external power supply. However, the present invention is not limited to dual power supplies. The power supply system in accordance with one embodiment of the present invention can also include multiple power supplies. The primary power supply 104 may be a battery pack, for example. The secondary power supply 102 may be either a battery pack or an adapter (e.g., an AC adapter), for example. In one embodiment, the primary power supply 104 includes a battery pack having a voltage of between 6 volts and 12.6 volts, and the secondary power supply 102 includes an adapter applied at VAD+ and GND.

Advantageously, the dual power supply system 100 can work under at least three power modes, in one embodiment. The primary power supply 104 provides power to the output 190 when a voltage level of the secondary power supply 102 is less than a first predetermined level REF_D. The secondary power supply 102 provides power to the output 190 when the voltage level of the secondary power supply 102 is greater than the first predetermined level REF_D. In addition, the secondary power supply 102 charges the primary power supply 104 when the voltage level of the secondary power supply 102 is greater than a second predetermined level REF_C that is greater than the first predetermined level REF_D. In one embodiment, the magnitudes of the first predetermined level REF_D and the second predetermined level REF_C are predetermined based on system (load 110) needs and the nominal value of the primary power supply 104.

A controller 120 is coupled to the primary power supply 104 and the secondary power supply 102 for controlling the primary power supply 104 and the secondary power supply 102, in one embodiment. More specifically, the controller 120 selects one of the above three different power modes according to the voltage level of the secondary power supply 102, in one embodiment.

The controller 120 selects between the different power modes by controlling a first discharging switch 112, a second discharging switch 114, a charging switch 116, and a switch 118. Switches 112, 114, 116, and 118 can be PMOS transistors, in one embodiment. In one embodiment, the control signals 166, 162 and 164 of open drain transistors 142, 144 and 146 are enough to drive the gate of switches 112, 118 and 114, respectively.

The secondary power supply 102 provides power to the system load 110 via the first discharging switch 112, in one embodiment. The primary power supply 104 provides power to the system load 110 via the second discharging switch 114 and switch 118, in one embodiment. The switch 118 is used to isolate the primary power supply 104 from the system load 110, in one embodiment. The secondary power supply 102 charges the primary power supply 104 via switch 118 and the charging switch 116, in one embodiment.

The primary power supply 104 may also provide power to the system load 110 via the charging switch 116 and the switch 118. However, it can be more efficient for the primary power supply 104 to power the system load 110 via the second discharging switch 114 and the switch 118, in one embodiment.

The first discharging switch 112 controlled by the controller 120 is coupled between the secondary power supply 102 and the output 110. The first discharging switch 112 is switched on when the voltage level of the secondary power supply 102 is greater than the first predetermined level REF_D, in one embodiment. Otherwise, the first discharging switch 112 is switched off. As such, the secondary power supply 102 powers the load 110 via the first discharging switch 190, in one embodiment.

The second discharging switch 114 controlled by the controller 120 is coupled between the primary power supply 104 and the output 190. The second discharging switch 114 is switched on when the voltage level of the secondary power supply 102 is less than the first predetermined level REF_D, in one embodiment. A switch 118 coupled between the second discharging switch and the output 190 is also on when the voltage level of the secondary power supply 102 is less than the first predetermined level REF_D, which will be discussed in the following. As such, the primary power supply 104 powers the load 110 via the second discharging switch 114 and the switch 118, in one embodiment.

The charging switch 116 in a step-down converter 170 is coupled between the primary power supply 104 and the secondary power supply 102. The charging switch 116 is also controlled by the controller 120. The charging switch 116 is switched on and off alternately when the voltage level of the secondary power supply 102 is greater than the second predetermined level REF_C. The switch 118 coupled between the charging switch 116 and the output 190 is switched on when the voltage level of the secondary power supply 102 is greater than the second predetermined level REF_C, which will be discussed in the following. As such, the secondary power supply 102 charges the primary power supply 104 via switch 118 and the charging switch 116, in one embodiment.

The switch 118 is coupled between the output 190 and the primary power supply 104. The switch 118 is also controlled by the controller 120. In general, the switch 118 will be switched on when the primary power supply 104 powers the load 110 or when the secondary power supply 102 charges the primary power supply 104. More specifically, the switch 118 is switched on when the voltage level of the secondary power supply 102 is less than the first predetermined level REF_D or when the voltage level of the secondary power supply 102 is greater than the second predetermined level REF_C.

The controller 120 comprises a comparator 126 coupled to a sense resistor 130. The comparator 126 can be used to compare a current, which is flowing from the secondary power supply 102 to the output 190, with a threshold, and to control the first discharging switch 112. If the current flowing from the secondary power supply 102 is greater than an internal threshold of the comparator 126, the first discharging switch 112 will be switched on, in one embodiment. Otherwise, the first discharging switch 112 will be switched off.

The controller 120 comprises a comparator 122 with its positive terminal coupled to a voltage source 152 and its negative terminal coupled to the secondary power supply 102. In one embodiment, the voltage source 152 has a voltage level of REF_D. The comparator 122 can be used to compare the voltage level of the secondary power supply 102 with a first predetermined level REF_D and to control the second discharging switch 114. In one embodiment, the comparator 122 controls the second discharging switch 114 via a switch 146 (shown as an open drain transistor 146). If the voltage level of the secondary power supply 102 is less than the first predetermined level REF_D, the transistor 146 will be on and the signal 164 will be low. As such, the second discharging switch 114 controlled by the signal 164 will be switched on, in one embodiment. In contrast, if the voltage level of the secondary power supply 102 is greater than the first predetermined level REF_D, the second discharging switch 114 will be switched off.

The controller 120 comprises a comparator 124 with its negative terminal coupled to a voltage source 154 and its positive terminal coupled to the secondary power supply 102. In one embodiment, the voltage source 154 has a voltage level of REF_C. The comparator 124 can be used to compare the voltage level of the secondary power supply 102 with a second predetermined level REF_C, and to enable a charger controller 160. If the voltage level of the secondary power supply 102 is greater than the second predetermined level REF_C, signal 184 will be high and the charger controller 160 will be enabled, in one embodiment. Otherwise, the charger controller 160 will be disabled.

The charger controller 160 receives a monitoring signal 172 indicative of a current of the primary power supply 104 and a monitoring signal 174 indicative of a voltage of the primary power supply 104, in one embodiment. In one embodiment, the charger controller 160 controls the charging current of the primary power supply 104 by a pulse width modulation signal 176. The pulse width modulation signal 176 alternately switches on the charging switch 116 in a step-down converter 170, in one embodiment. The charger controller 160 adjusts a duty cycle of the pulse width modulation signal 176 according to the monitoring signal 172 and the monitoring signal 174, in one embodiment.

An OR gate 150 receives the signal 182 and the signal 184 from the comparator 122 and the comparator 124, respectively. As such, when the voltage level of the secondary power supply 102 is less than the first predetermined level REF_D or when the voltage level of the secondary power supply 102 is greater than the second predetermined level REF_C, the output of the OR gate 150 will be high. Consequently, a switch 144 (shown as an open drain transistor 144) will be switched on, which in turn switches on the switch 118.

A voltage monitor 180 monitors the primary power supply 104 and the secondary power supply 102, in one embodiment. In one embodiment, monitoring signals 136 and 138 can be digital signals which are active when the voltages of the primary power supply 104 and the secondary power supply 102 are below a certain threshold. Monitoring signals 136 and 138 are delivered to a host system, in one embodiment. A bias voltage generator 108 is used to provide power for elements (e.g., comparators 122, 124, and 126) in the controller 120, in one embodiment.

Figure 2:
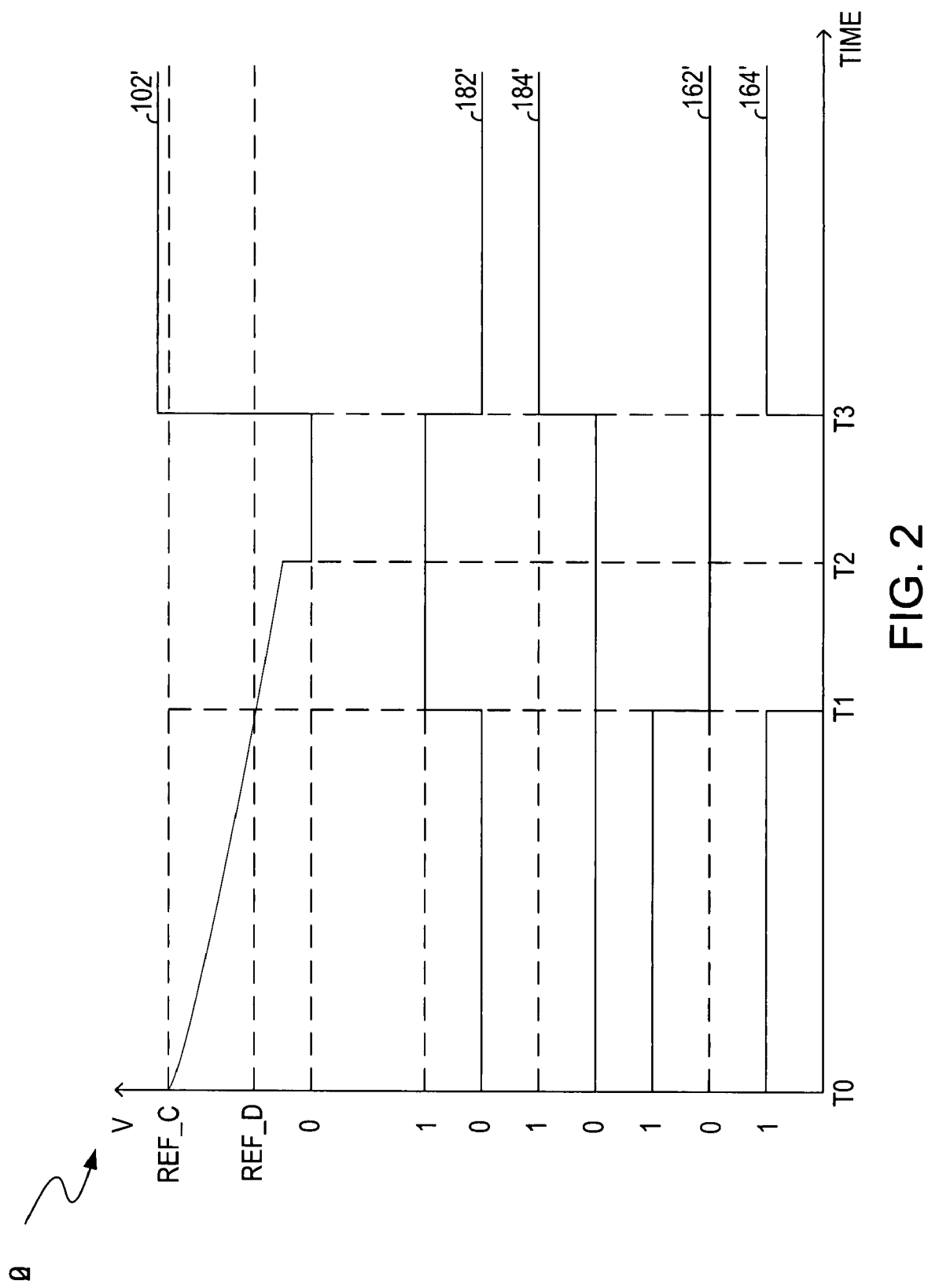
FIG. 2 shows a timing diagram of a dual power supply topology during operation, in accordance with one embodiment of the present invention.

FIG. 2 is a example of a timing diagram of the dual power supply topology 100 in FIG. 1 during operation, in accordance with one embodiment of the present invention. FIG. 2 will be described in combination with FIG. 1.

In the example of FIG. 2, the primary power supply 104 is a battery pack and the secondary power supply is also a battery pack. Waveform 102' represents the voltage level of the secondary power supply 102. Waveform 182' represents the output signal 182 of the comparator 122. Waveform 184' represents the output signal 184 of the comparator 124. Waveform 162' represents the control signal of the switch 118. Waveform 164' represents the control signal 164 of the second discharging switch 114.

From time t0 to t1, the voltage level of the secondary power supply 102 is greater than the first predetermined level REF_D and less than the second predetermined level REF_C. Consequently, the output 182 of the comparator 122 is low and the output 184 of the comparator 124 is low. As such, the transistor 144 controlled by the OR gate 150 remains OFF. Therefore, the control signal 162 is high and the switch 118 remains off. In addition, the transistor 146 controlled by the output 182 of the comparator 122 is also switched off. Therefore, the control signal 164 is high and the second discharging switch 114 is also off. Therefore, the primary power supply 104 is isolated from the load 110. As long as the current from the secondary power supply 102 to the output 190 is greater than the internal threshold of the comparator 126, the transistor 142 will be switched on. As a result, the secondary power supply 102 provides power to the load 110 via the first discharging switch 112 from time t0 to t1.

In the example of FIG. 2, the voltage of the secondary power supply 102 gradually decreases. From time t1 to t2, the voltage level of the secondary power supply 102 is less than the first predetermined level REF_D. Consequently, the output 182 of the comparator 122 is high and the output 184 of the comparator 124 is low. As such, the transistor 144 controlled by the OR gate 150 is switched on. Therefore, the control signal 162 is low and the switch 118 is switched on. In addition, the transistor 146 controlled by the output 182 of the comparator 122 is also switched on. Thus, the control signal 164 is low and the second discharging switch 114 is also switched on. As a result, the primary power supply 104 powers the load 110 via switches 114 and 118. Meanwhile, the secondary power supply 102 is isolated from the load 110 by the first discharging switch 112.

Advantageously, the user is able to replace the secondary power supply 102 (e.g., a battery pack) from time t2 to t3 while the system is still powered by the primary power supply 104 without interrupting any ongoing process, in one embodiment.

After the user replaces the secondary power supply 102, the voltage of the replaced secondary power supply can be greater than the second predetermined level REF_C from time t3, as shown in FIG. 2. As such, the output 182 of the comparator 122 is low and the output 184 of the comparator 124 is high. Therefore, the transistor 144 controlled by the OR gate 150 is switched on. Consequently, the control signal 162 is low and the switch 118 is switched on. In addition, the transistor 146 controlled by the output 182 of the comparator 122 is switched off. Therefore, the control signal 164 is high and the second discharging switch 114 is off.

Furthermore, if the voltage level of the secondary power supply 102 is greater than the second predetermined level REF_C, the charger controller 160 will be enabled, in one embodiment. As such, the charger controller 160 will generate a pulse width modulation signal 176 for controlling the charging switch 116. The secondary power supply 102 charges the primary power supply 104 through a charger shown as a switching mode step-down converter 170. In addition, the first discharging switch 112 is switched on from time t3. Therefore, from time t3, the secondary power supply 102 not only powers the load 110 via the first discharging switch 112, but also charges the primary power supply 104 via switches 118 and 116.

The above description shows that the user is able to replace the secondary power supply 102 while the system load 110 is powered by the primary power supply 104, in one embodiment. The user can also replace the primary power supply 104 while the system load 110 is powered by the secondary power supply 102, in another embodiment. Repetitive descriptions will be omitted herein for purposes of brevity and clarity.

As described in the example of FIG. 2, both primary power supply 104 and secondary power supply 102 are battery packs. In another embodiment, the secondary power supply 102 may instead be an adapter. In such case, the secondary power supply 102 will output a constant voltage which is greater than the second predetermined level REF_C. As a result, the secondary power supply 102 not only powers the system load 110, but also charges the primary power supply 104.

FIG. 3 shows a table illustrating the status of different switches of the dual power supply 100 in FIG. 1 when the system load is in operation, in accordance with one embodiment of the present invention. FIG. 3 is described in combination with FIG. 1.

As shown in FIG. 3, when the voltage level $V_{102}$ of the secondary power supply 102 is less than the first predetermined level REF_D ($V_{102}$<REF_D), the first discharging switch 112 is off. The switch 118 and the second discharging switch 114 are on. As such, the system load 110 is powered by the primary power supply 104.

When the voltage level $V_{102}$ of the secondary power supply 102 is greater than the first predetermined level REF_D and less than the second predetermined level REF_C (REF_D<$V_{102}$<REF_C), the first discharging switch 112 is on. The switch 118 and the second discharging switch are off. As such, the system load 110 is powered by the secondary power supply 102.

When the voltage level $V_{102}$ of the secondary power supply 102 is greater than the second predetermined level REF_C ($V_{102}$>REF_C), the first discharging switch 112 and the switch 118 are on. The second discharging switch 114 is off. As such, the system load 110 is powered by the secondary power supply 102 and the secondary power supply 102 also charges the primary power supply 104 through a charger 170.

Figure 4:
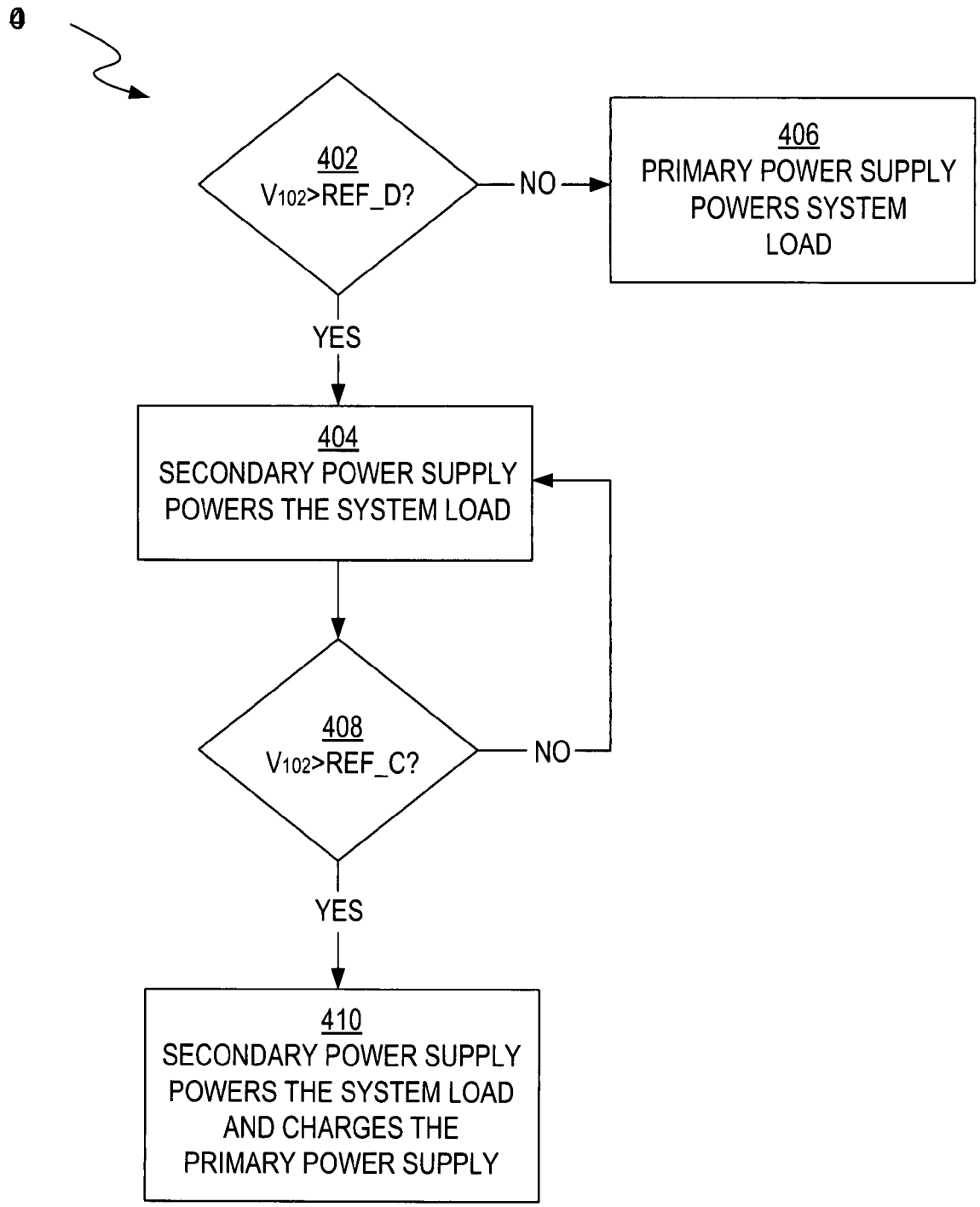
FIG. 4 is a flowchart of a method of implementing a dual battery supply topology, in accordance with one embodiment of the present invention.

FIG. 4 is a flowchart 400 of a method of implementing a dual battery supply topology, in accordance with one embodiment of the present invention. FIG. 4 is described in combination with FIG. 1.

In block 402, the voltage level $V_{102}$ of secondary power supply 102 is compared to a first predetermined voltage (REF_D). In block 404, if the voltage level $V_{102}$ of the secondary power supply is greater than the first predetermined voltage (REF_D), then the secondary power supply 102 powers the system load 110 and the primary power supply 104 is isolated from the system load 110. More specifically, if the voltage level $V_{102}$ of the secondary power supply is greater than the first predetermined voltage (REF_D), a first discharging switch 112 coupled between the secondary power supply 102 and the load 110 will be controlled to be switched on, in one embodiment.

Otherwise, in block 406, the primary power supply 104 powers the system load 110. More specifically, if the voltage level $V_{102}$ of the secondary power supply is not greater than the first predetermined voltage (REF_D), a second discharging switch 114 coupled between the primary power supply 104 and the load 110 will be controlled to be switched on, in one embodiment.

In block 408, the voltage level $V_{102}$ of the secondary power supply 102 is also compared to a second predetermined voltage (REF_C) that is greater than the first predetermined voltage (REF_D). If the voltage level $V_{102}$ of the secondary power supply 102 is not greater than the second predetermined voltage (REF_C), then flowchart 400 returns to block 404. Otherwise, in block 410, the secondary power supply 102 both powers the system load 110 and charges the primary power supply 104. More specifically, a charging switch 116 coupled between the primary power supply 104 and the secondary power supply 102 will be controlled to be switched on and off alternately, in one embodiment.

Accordingly, in one embodiment, the present invention provides a power supply system capable of determining the discharging priority. Advantageously, in on such embodiment, the power supply system allows a system load to be powered by a secondary power supply (external power supply) until the voltage level of the secondary power supply is below a predetermined threshold. In one such embodiment, the power supply system also allows a user to replace the secondary power supply while the system is on and powered by a primary power supply (internal power supply). In one such embodiment, the power supply system also allows the user to replace/remove the primary power supply while the system is on and powered by the secondary power supply.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A power supply system comprising:
    a primary power supply coupled to an output through a first switch and a second switch;
    a secondary power supply coupled to said output through a third switch, and coupled to said primary power supply through said third switch, said second switch and a power converter; and
    a controller coupled to said secondary power supply and for switching on and off said third switch according to a first comparison result of a current flowing from said secondary power supply to said output with a threshold, for switching on and off said first switch according to a second comparison result of a voltage level of said secondary power supply with a first predetermined level, for enabling said power converter according to a third comparison result of said voltage level with a second predetermined level that is greater than said first predetermined level, and for switching on and off said second switch according to a combination of said second comparison result and said third comparison result,
    wherein said primary power supply provides power to said output via said first switch and said second switch when said voltage level is less than said first predetermined level, wherein said secondary power supply provides power to said output via said third switch when said voltage level is greater than said first predetermined level, and wherein said power converter is further enabled to receive power from said secondary power supply via said third and said second switches to charge said primary power supply when said voltage level is greater than said second predetermined level.

2. The power supply system as claimed in claim 1, wherein said threshold comprises an internal threshold of a comparator within said controller.

3. The power supply system as claimed in claim 1, wherein said power converter comprises a charging switch, and wherein said charging switch is switched on and off alternately when said power converter is enabled.

4. The power supply system as claimed in claim 1, wherein said second switch is switched on if said voltage level is greater than said first predetermined level and less than said second predetermined level.

5. A method for powering a load, comprising:
    turning on and off a first switch according to a first comparison result of a current flowing from a secondary power supply to said load with a threshold;
    turning on and off a second switch according to a second comparison result of a voltage level of said secondary power supply with a first predetermined level;
    enabling a power converter according to a third comparison result of said voltage level with a second predetermined level that is greater than said first predetermined level;
    turning on and off a third switch according to a combination of said second comparison result and said third comparison result;
    delivering power from a primary power supply to said load via said second switch and said third switch when said voltage level is less than said first predetermined level;
    delivering power from said secondary power supply to said load via said first switch when said voltage level is greater than said first predetermined level; and
    delivering power from said secondary power supply to said power converter via said first and said third switches to charge said primary power supply when said voltage level is greater than said second predetermined level.

6. The method as claimed in claim 5, wherein said threshold comprises an internal threshold of a comparator.

7. The method as claimed in claim 5, further comprising:
    alternately turning on and off a charging switch when said power converter is enabled.

* * * * *